Figure 1:
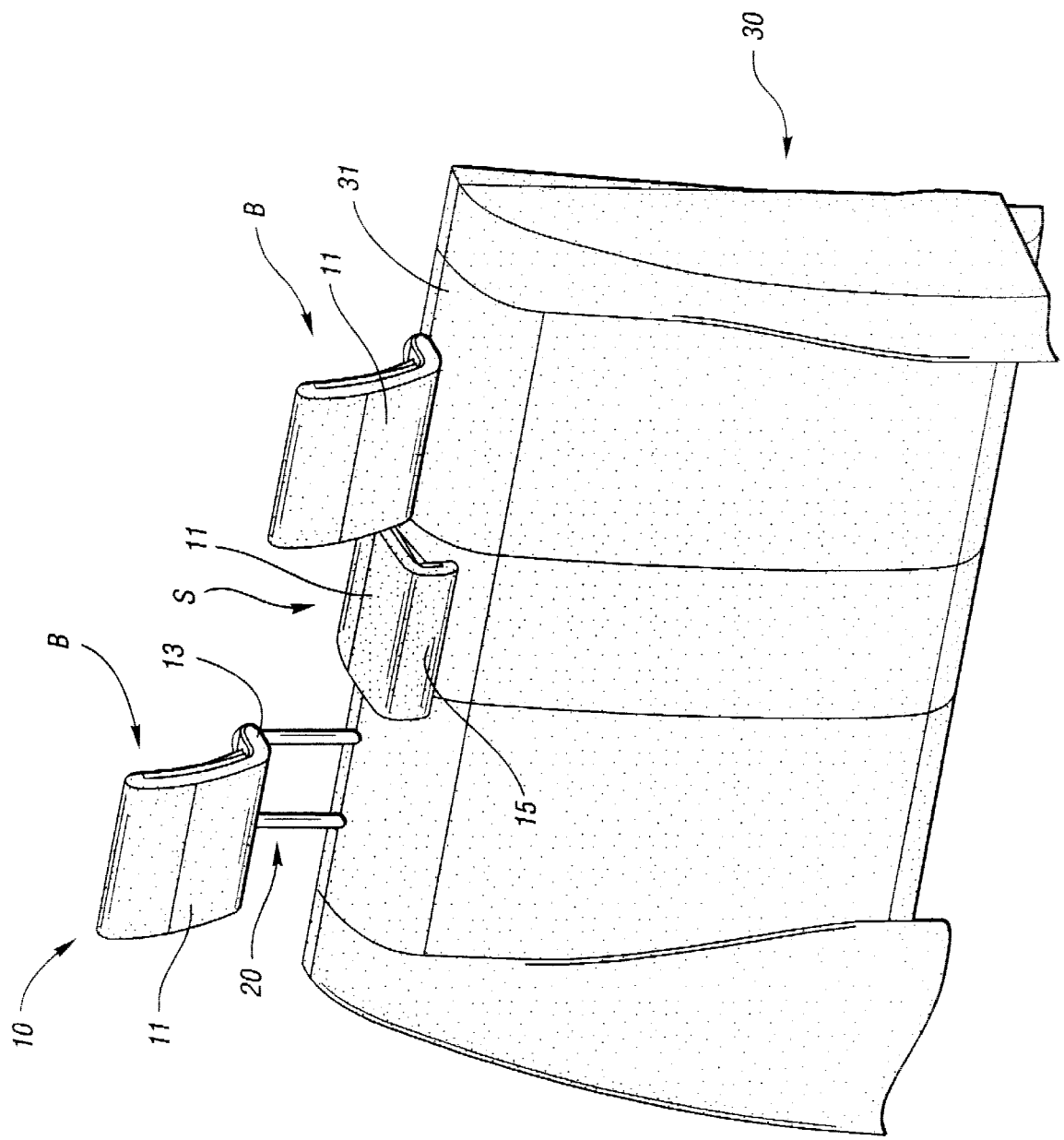

United States Patent
Schneider

[19]

[11] Patent Number: 6,113,192
[45] Date of Patent: Sep. 5, 2000

[54] FOLDABLE HEAD REST

[75] Inventor: Ulrich Schneider, Isen, Germany

[73] Assignee: Lear Corporation, Southfield, Mich.

[21] Appl. No.: 09/293,086

[22] Filed: Apr. 16, 1999

[30] Foreign Application Priority Data

Apr. 17, 1998 [DE] Germany ............................ 198 17 155

[51] Int. Cl.[7] .................................................. A47C 7/36
[52] U.S. Cl. .......................................... 297/403; 297/408
[58] Field of Search .................................... 297/391, 403, 297/408

[56] References Cited

U.S. PATENT DOCUMENTS

| | | | |
|---|---|---|---|
| 3,304,120 | 2/1967 | Cramer | 297/403 X |
| 4,527,834 | 7/1985 | Zyngier | 297/391 |
| 4,623,166 | 11/1986 | Andres et al. | 297/403 |
| 4,711,494 | 12/1987 | Duvenkemp | 297/403 |
| 5,145,233 | 9/1992 | Nagashima | 297/403 X |

Primary Examiner—Anthony D. Barfield
Attorney, Agent, or Firm—Brooks & Kushman PC

[57] ABSTRACT

Previously known are headrests for the backrest of a seat of a motor vehicle, in particular for rear seats, which include a support mechanism which is attachable to a top edge of the backrest of a seat. A support element is provided which comprises an upholstered front surface to support a head and which is attachable to the support mechanism. Headrests of this type obstruct the view through the rear window and interfere when folding down the backrest of a seat. It is proposed to attach the support element so as to be movable around an axis of rotation from an operational position into a storage position. In the operational position, the support element is with its front surface substantially upwardly oriented, thus extending the backrest of a seat and projecting upwards from the backrest of the seat. In its storage position, the support element rests on the backrest of a seat and is aligned substantially horizontal with the front surface or parallel to the top edge of the backrest of a seat whilst seated on the backrest of the seat.

4 Claims, 5 Drawing Sheets

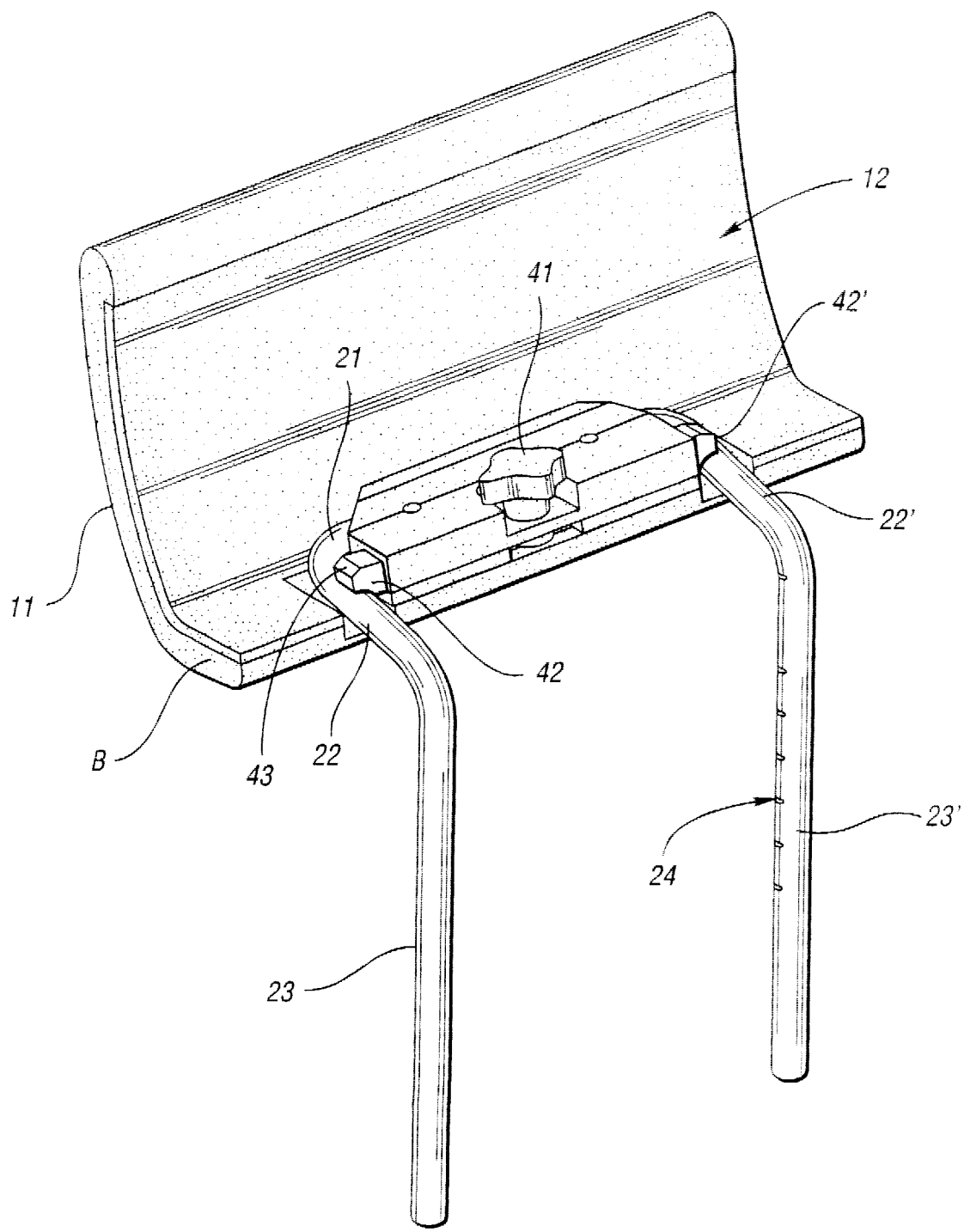

FOLDABLE HEAD REST

DESCRIPTION

The invention relates to a headrest for the backrest of a seat of a motor vehicle.

It is known that vehicle seats have to be fitted with headrests to prevent backlash of the head with related injuries to the neck vertebra. Headrests of this type are also required for rear seats and are in many countries prescribed by law.

It is a disadvantage of conventional headrests on rear seats that rearward visibility of the driver is obstructed. Furthermore, the headrests interfere when an attempt is made to fold down the backrest so as to increase the load volume; naturally, this also applies to front seats.

Most headrests are removable in order to improve visibility or prevent such obstructions when folding down the back rests. This is, on the one hand, elaborate and, on the other hand, the removed headrest has to be stored away, thus taking up space in either the cabin or the boot.

The object underlying the present invention is to further develop a headrest of the aforedescribed type so that storage for the purpose of removing obstructions will be possible in a simple manner without reducing the safety factor.

This object is achieved by the features of Patent claim 1.

In particular, a headrest for the backrest of a vehicle seat is disclosed, in particular for rear vehicle seats, comprising a support mechanism which is mountable onto a top edge of the backrest of a seat and a support element, in particular with an upholstered front surface which is mountable on a support mechanism, for supporting a head. The support element is then movable around an axis of rotation from an operational position into a storage position.

In its operational position, the support element projects, whilst extending the backrest of the seat and with the front surface substantially upright, from the seating surface upwards, but when in its storage position, it is seated on the backrest of the seat with the front surface substantially horizontal or parallel to the top edge of the backrest of the seat.

The support element is preferably lockable in the operational position, i.e. preferably in such a manner that it locks into the operational position when moved from the storage position into the operational position without having to operate additional locking elements. When folding it from the operational position into the storage position, a locking element is again operated (unlocked) to allow folding of the support element.

The support element preferably comprises a rear surface of concave design for tight abutment to the top edge of the backrest of the seat, and the front surface is designed in a conventional manner, i.e. slightly convex.

The support element is preferably designed and mounted on the support mechanism in such a manner that sections of the support mechanism which project over the top edge of the backrest of the seat are accommodated in the support element when the support element is in the storage position. This offers maximum spacesaving and improvement of visibility, respectively.

The support element preferably comprises an end section, which extends substantially perpendicularly to its front surface and which establishes in the operational position a base surface and in the storage position an auxiliary front surface. This design not only satisfies esthetic perspectives but also ensures that danger of injury is avoided even when the support element has been stored away.

The support element is then preferably attached to the support mechanism in such a manner that the axis of rotation lies in a connecting area between the front surface and the auxiliary front surface, so that the auxiliary front surface in the storage position merges directly into the backrest of the seat or is seated thereon.

The support mechanism is in a height-adjustable and lockable or fixable manner mounted in the backrest of the seat so that one can not only adjust the support element in a conventional manner to the size of a passenger but can firmly rest it in the storage position on the top edge of the backrest of the seat.

Figure 2:
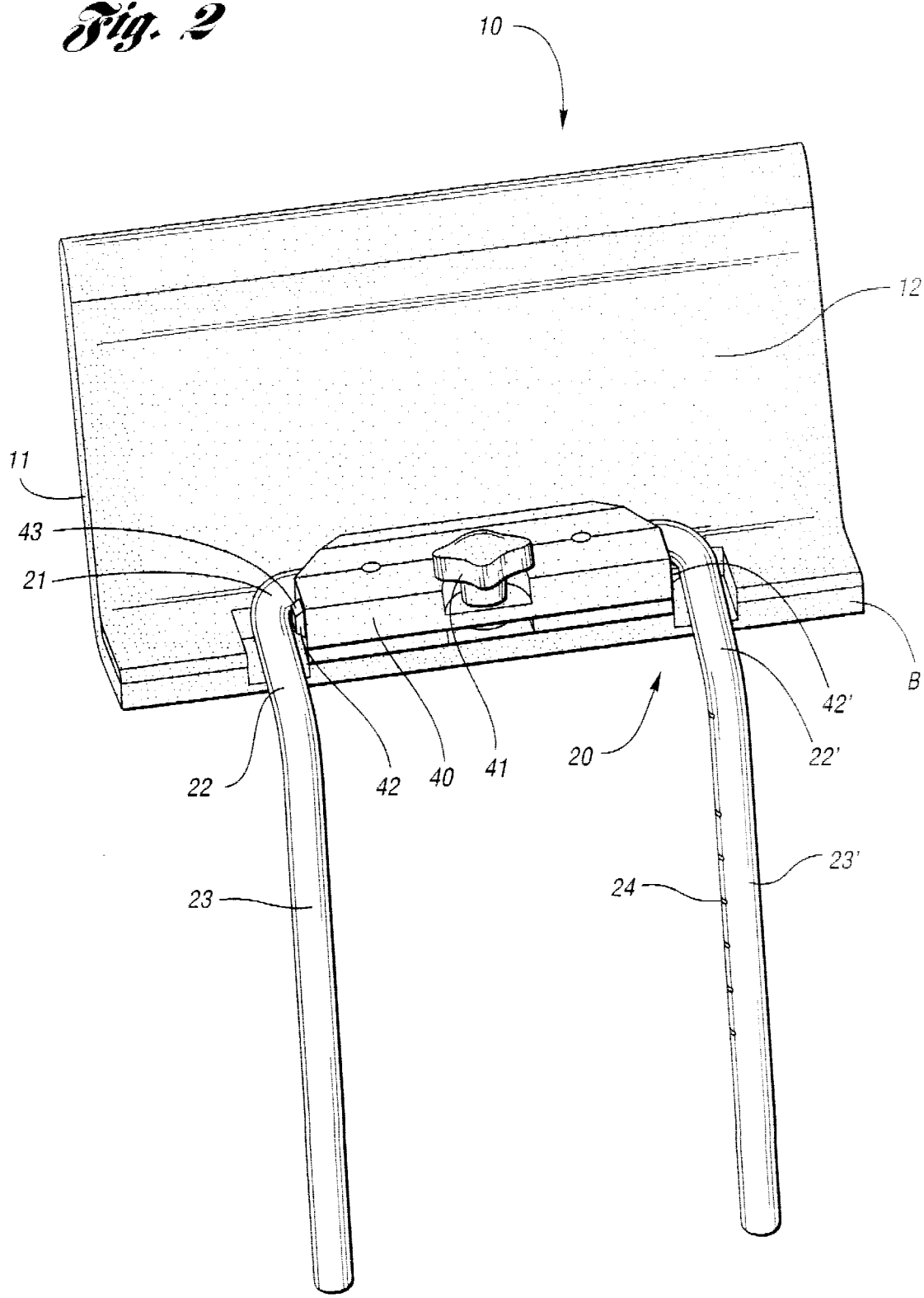
Figure 3:
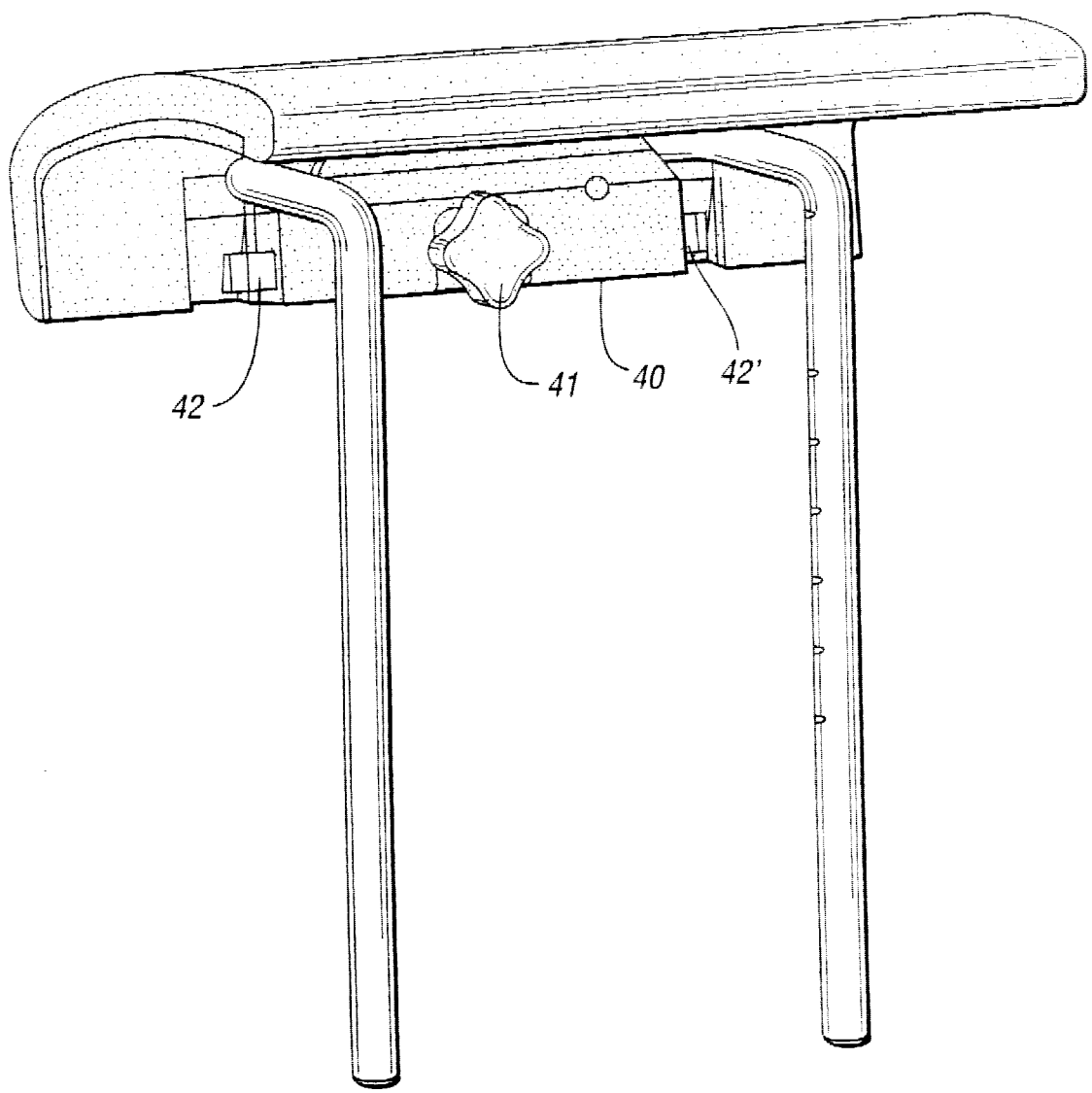
Figure 4:
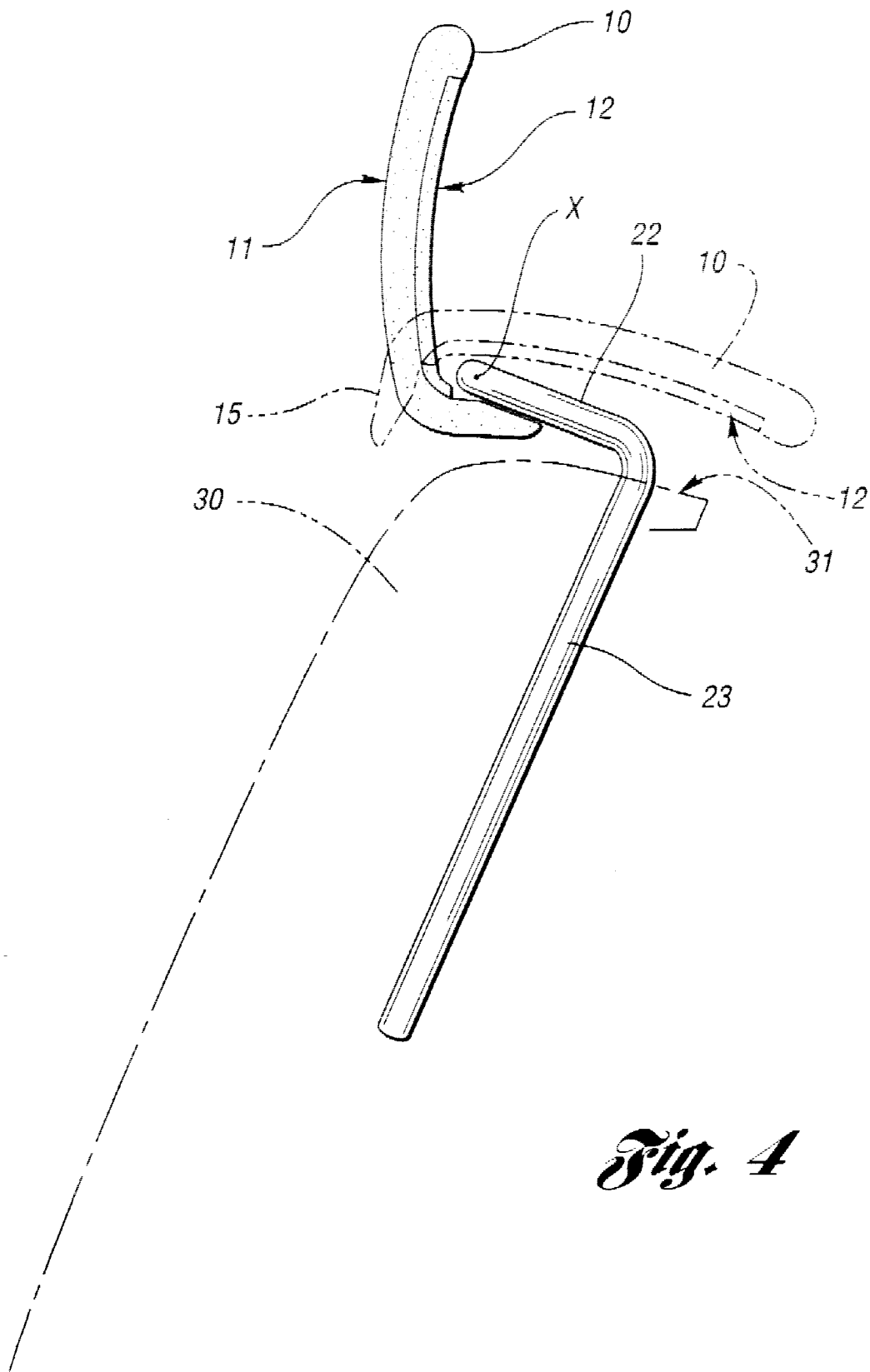

Preferred forms of embodiment of the invention are readily apparent from the subclaims and the following description of an exemplary embodiment which will be explained in more detail with reference to the attached illustrations. The drawings show in FIG. 1 a perspective view of the backrest of a rear seat with three support elements which are illustrated in different positions;

FIG. 2 a perspective rear view of a support element in its operational position;

FIG. 3 a perspective rear view of the support element in its storage position;

FIG. 4 a diagrammatical side view of a support element in its operational position (continuous lines) and in its storage position (broken lines); and FIG. 5 a perspective view of the support element with further details in a rear view.

In the following description, the same parts or those of same effects are given the same reference signs.

As can be inferred from FIG. 1, the illustrated form of embodiment of the headrest according to the invention comprises a support element 10 which is mounted in the backrest 30 of a seat or in its top edge 31, respectively, of a support mechanism 20. The support element 10 comprises an (upholstered) front surface which is in its operational position B of the support element (10) aligned in a forward direction, i.e. substantially parallel to the surface of the backrest 30.

The front surface 11 of the support element 10 merges via a rounded off area into an auxiliary front surface 15, which is substantially perpendicular to the front surface 11 and which again extends substantially parallel to the surface of the backrest 30 when in the storage position S of the support element 10 (see FIG. 1 centre), i.e. when the front surface 11 is substantially aligned parallel to the top edge 31 of the backrest 30. Thus, it cannot be damaged even when folding the backrest 30 of the seat for the purpose of increasing the loading capacity, and it does not present any obstacle to laying down the back rest.

The support mechanism 20, which is illustrated in more detail in FIGS. 2, 3 and 5, comprises a bracket composed of parallel insert sections 23, 23' which merge via substantially rectangular applied curvature sections 22, 22' into an interconnecting transverse bracket 21.

On the support element 10 is provided a support piece 40 which embraces the transverse bracket 21 in such a manner that the support element 10 is, on the one hand, pivotal and, on the other hand, firmly held. The attachment is such that the axis of rotation X, as established by the centre axis of the transverse bracket 21, lies as illustrated in FIG. 4 in the area of transition between the end section 13 which forms the auxiliary front surface 15 and the section of the support element 10 which forms the front surface 11.

This section is designed in such a manner that it establishes a concave rear surface 12 of the support element 10. When the support element 10 is tipped or folded into its storage position as illustrated in FIG. 3 or outlined in FIG. 4 by broken lines, then the curvature sections 22, 22' are covered by the concave rear surface 12.

For securing the support element 10 in its (substantially upright) operational position, a pair of bolts 42, 42' is provided in the support piece 40, which are movable by means of a handle 41 via a gear linkage or an actuating cable from an extracted locking position (FIG. 5) into a retracted unlocking position (FIG. 2). When releasing the handle 41 after unlocking and folding of the support element 10, then a spring mechanism will ensure that bolts 42, 42' return into their extracted position as shown in FIG. 3.

Furthermore, the bolts 42, 42' comprise slanted surfaces 43 which are shaped in such a manner that, when tipping or folding the support element from its storage position (FIG. 3) into its operational position (FIG. 2), the curvature sections 22, 22' engage the slanted surfaces 43 and thus displace the bolts 42, 42' inwardly into the support piece 40. As soon as the operational position is arrived at, the bolts 42, 42' can snap back and lock the support element in its upright position shown in FIG. 5.

For storing the support element 10, i.e. for clearing the field of vision of the driver or for folding the backrest 30 of the seat, the handle 41 is operated so that the bolts 42, 42' are pulled back and release the curvature sections 22, 22', whereupon the support element 10 is tipped over (see FIG. 3) and pressed downwards in the direction of the top edge 31 so that the insert sections 23, 23' are pushed into the backrest 30 of the seat and remain, due to thereat provided detent notches 24, in a position in which the rear surface 12 of the support element 10 is substantially firmly seated on the top edge 31 whilst covering the support piece 40 or the curvature sections 22, 22', respectively. The auxiliary front surface 15 then merges essentially directly into the backrest 30 of the seat as is illustrated in connection with the centre headrest of FIG. 1.

| List of Reference Signs | |
|---|---|
| 10 | Support Element |
| 11 | Front Surface |
| 12 | Rear Surface |
| 13 | End Section |
| 15 | Auxiliary Front Surface |
| 20 | Support Mechanism |
| 21 | Transverse Bracket |
| 22, 22' | Curvature Section |
| 23, 23' | Insert Section |
| 24 | Detent Notch |
| 30 | Backrest of a Seat |
| 31 | Top Edge |
| 40 | Support Piece |
| 41 | Handle |
| 42, 42' | Bolts |
| 43 | Slanted Surface |
| $X$ | Axis of Rotation |
| $B$ | Operational Position |
| $S$ | Storage Position |

What is claimed is:

1. A headrest for a backrest of a seat of a motor vehicle, comprising a support mechanism which is mountable onto a top edge of the backrest of a seat; a support element which is mountable to a support mechanism, with a front surface to support a head, characterized in that the support element is movable around an axis of rotation (X) from an operational position (B) into a storage position (S); wherein in the operational position (B), the support element projects substantially upwards from the backrest of the seat by means of the front surface; and in that in the storage position (S), the support element rests on the backrest of the seat, with the front surface substantially parallel to the top edge of the backrest of the seat while seated on the backrest of the seat;

the support element comprises an end section which extends substantially perpendicularly to the front surface and which establishes in the operational position (B) a base surface and in the storage position (S) an auxiliary front surface; and the support element is attached to the support mechanism in such a manner that the axis of rotation (X) lies in a connecting area between the front surface and the auxiliary front surface.

2. The headrest according to claim 1, characterized in that the support element is lockable in the operational position (B) by snapping in during movement from the storage position (S) into the operational position (B).

3. The headrest according to claim 1, characterized in that the support element comprises a rear surface of concave design for close abutment to the top edge of the backrest of the seat.

4. The headrest according to claim 1, characterized in that the support element is designed and mounted on the support mechanism in such a manner that sections of the support mechanism which project over the top edge of the backrest of the seat can be accommodated in the support element.

* * * * *